(12) United States Patent
Dharanikota et al.

(10) Patent No.: US 11,640,476 B2
(45) Date of Patent: *May 2, 2023

(54) METHODS FOR BIG DATA USAGE MONITORING, ENTITLEMENTS AND EXCEPTION ANALYSIS

(71) Applicant: JPMorgan Chase Bank, N.A., New York, NY (US)

(72) Inventors: Krishna Prashanth Dharanikota, Hyderabad (IN); Rajan Mehndiratta, Skillman, NJ (US); Sreemannarayana Balineni, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/356,856

(22) Filed: Jun. 24, 2021

(65) Prior Publication Data

US 2021/0326466 A1 Oct. 21, 2021

Related U.S. Application Data

(63) Continuation of application No. 16/225,329, filed on Dec. 19, 2018, now Pat. No. 11,048,811.

(51) Int. Cl.
| | |
|---|---|
| G06F 21/62 | (2013.01) |
| G06F 21/60 | (2013.01) |
| G06F 21/64 | (2013.01) |
| G06F 16/26 | (2019.01) |
| H04L 43/045 | (2022.01) |
| H04L 43/08 | (2022.01) |

(52) U.S. Cl.
CPC .......... *G06F 21/6218* (2013.01); *G06F 16/26* (2019.01); *G06F 21/604* (2013.01); *G06F 21/64* (2013.01); *H04L 43/045* (2013.01); *H04L 43/08* (2013.01)

(58) Field of Classification Search
CPC .... G06F 21/6218; G06F 21/604; G06F 21/64; G06F 16/26; H04L 43/08; H04L 43/045
See application file for complete search history.

(56) References Cited

U.S. PATENT DOCUMENTS

| | | | |
|---|---|---|---|
| 11,132,357 B1 * | 9/2021 | Garapati | ............... G06F 3/0482 |
| 2014/0237554 A1 | 8/2014 | Narayanan et al. | |
| 2015/0026823 A1 | 1/2015 | Ramesh et al. | |
| 2017/0053242 A1 | 2/2017 | Ayyaswami | |
| 2017/0374076 A1 | 12/2017 | Pierson et al. | |
| 2018/0255080 A1 * | 9/2018 | Paine | ..................... G06F 21/57 |
| 2018/0314853 A1 * | 11/2018 | Oliner | ................ G06F 21/6254 |
| 2019/0303487 A1 | 10/2019 | Mehta et al. | |
| 2020/0117757 A1 | 4/2020 | Yanamandra et al. | |
| 2020/0185091 A1 | 6/2020 | Davis | |

* cited by examiner

*Primary Examiner* — Thaddeus J Plecha (74) *Attorney, Agent, or Firm* — Greenblum & Bernstein, P.L.C.

(57) ABSTRACT

The invention relates to methods for implementing a unified framework for big data usage analytics and security profiling across heterogeneous platforms and multiple clusters. An embodiment of the present invention may be applied in various applications and use cases. This may include auditing for Big Data lakes; capacity assessment and charge back functionality for Big Data infrastructure and clusters and resource usage analytics.

20 Claims, 8 Drawing Sheets

PII Queries by SID and Date

Click any bar to see record level detail. Click again to hide detail. Click the download button to export all data in CSV format.

| Date | SID | Username | Count |
|---|---|---|---|
| 07/09/18 | i563049 | SMITH, JOHN | 32 |
| 09/12/18 | i563049 | SMITH, JOHN | 31 |
| 07/10/18 | i563049 | SMITH, JOHN | 24 |
| 09/24/18 | i563049 | SMITH, JOHN | 23 |
| 09/11/18 | i563049 | SMITH, JOHN | 11 |
| 09/25/18 | i563049 | SMITH, JOHN | 10 |
| 09/06/18 | i563049 | SMITH, JOHN | 5 |
| 09/27/18 | i563049 | SMITH, JOHN | 4 |
| 09/07/18 | i563049 | SMITH, JOHN | 3 |
| 09/10/18 | i563049 | SMITH, JOHN | 3 |
| 09/14/18 | i563049 | SMITH, JOHN | 2 |
| 07/13/18 | i563049 | SMITH, JOHN | 1 |
| 07/23/18 | i563049 | SMITH, JOHN | 1 |
| 07/24/18 | i563049 | SMITH, JOHN | 1 |
| 08/21/18 | i563049 | SMITH, JOHN | 1 |
| 09/14/18 | i563049 | SMITH, JOHN | 1 |

| DATE | TIME | SID | USERNAME | ENV\|SVC\|APP\|CL\|UP\|A | HOST | IP | DATABASE | TABLE | TYPE | ACTION | OPERATION TEXT | TEXT LEN | PII FIELDS |
|---|---|---|---|---|---|---|---|---|---|---|---|---|---|
| 07/10/18 | 13:12:29 | i563049 | SMITH, JOHN | PROD\|HIVE\|CLICKFOX\|MAP\|CEA PROD\|CLOUDERA | bxxxisr32n1 | 10.11.xxx.121 | cb_opsdata_r.. | coim_cust_.. | DML | SELECT | 'SELECT 'R_month_ending_dt'- | 10,195 | DESG_MKT_AREA_TXLTST_ GEO_RGN_NMLTST_GEO_M_ | 1 |
| 07/10/18 | 12:51:56 | i563049 | SMITH, JOHN | PROD\|HIVE\|CLICKFOX\|MAP\|CEA PROD\|CLOUDERA | bxxxisr32n1 | 10.11.xxx.121 | cb_opsdata_r.. | coim_cust_.. | DML | SELECT | 'SELECT * FROM (SELECT R_month_en.. | 10,195 | DESG_MKT_AREA_TXLTST_ GEO_RGN_NMLTST_GEO_M_ | 1 |
| 07/10/18 | 12:51:50 | i563049 | SMITH, JOHN | PROD\|HIVE\|CLICKFOX\|MAP\|CEA PROD\|CLOUDERA | bxxxisr32n1 | 10.11.xxx.121 | cb_opsdata_r.. | coim_cust_.. | DML | SELECT | 'SELECT * FROM (SELECT 'file_date', 'c.. | 10,195 | DESG_MKT_AREA_TXLTST_ GEO_RGN_NMLTST_GEO_M_ | 1 |

Data Use Monitoring Dashboard > User Search & Audit Tool > Last 90 Days > SMITH, JOHN

| 810 USER SID | 812 DATE | 814 PLATFORM | 816 CLUSTER | 818 APPLICATION | 820 SERVICE | 822 ENVIRONMENT | 824 DATABASE | 826 TABLE | 828 ACTION TYPE | 830 ACTION NAME |
|---|---|---|---|---|---|---|---|---|---|---|
| d571685 | (All) | (All) | (All) | (Multiple values) | (All) | PROD | (All) | (All) | DML | SELECT |

- O All Actions — 31
- O Authentication Failures — 6
- O Authorization Failures — 0
- ● PII Queries — 12
- O DML Queries — 22
- O DDL Queries — 3

832

07/16/18  07/21/18  07/26/18  07/31/18  08/05/18  08/10/18  08/15/18  08/20/18  08/25/18  08/30/18  09/04/18

| 840 DATE | 842 TIME | 844 SID | 846 USERNAME | 848 ENV\|SVC\|APP\|CLU\|PLA | 850 HOST | 852 IP | 854 DATABASE | 856 TABLE | 858 TYPE | 860 ACTION | 862 OPERATION TEXT | 864 TEXT LEN | 866 PII FIELDS | 868 |
|---|---|---|---|---|---|---|---|---|---|---|---|---|---|---|
| TOTAL | | | | | | | | | | | | | | |
| 09/05/18 | 17:23:53 | o571685 | SMITH, JOHN | PROD\|IMPALA\|TDDD\|MT-DISC.. | bdtcstr10n1 | 1xx.99.xx.33 | db_opsdata_r.. | mts_ach_wi.. | DML | SELECT | "SELECT * FROM db_ops.. | 107 | BENEF_ACCT_ID,BENEF_ADDR.. | 1 |
| 07/19/18 | 17:02:48 | o571685 | SMITH, JOHN | PROD\|HIVE\|TDDD\|MT-DISCOV.. | bdtcstr10n1 | 1xx.99.xx.33 | db_opsdata_c.. | v_mts_ach_.. | DML | SELECT | "select b.uit_par_name, .. | 447 | BENEF_ACCT_ID,BENEF_NAME.. | 1 |
| 07/19/18 | 17:02:48 | o571685 | SMITH, JOHN | PROD\|HIVE\|TDDD\|MT-DISCOV.. | bdtcstr10n1 | 1xx.99.xx.33 | db_opsdata_r.. | mts_ach_wi.. | DML | SELECT | "select b.uit_par_name, .. | 447 | BENEF_ACCT_ID,BENEF_NAME.. | 1 |

Figure 8

METHODS FOR BIG DATA USAGE MONITORING, ENTITLEMENTS AND EXCEPTION ANALYSIS

CROSS REFERENCE TO RELATED APPLICATIONS

This application is a continuation of U.S. Utility patent application Ser. No. 16/225,329, filed on Dec. 19, 2018, the contents of which are incorporated by reference herein in its entirety.

FIELD OF THE INVENTION

The invention relates generally to methods for implementing big data usage monitoring, entitlements and exception analysis.

BACKGROUND OF THE INVENTION

For various reasons, many entities implement several Big Data clusters built using a range of technologies. With this, there is a challenge to audit user activities spread across multiple services, multiple clusters and multiple platforms. This is not only a major limitation for auditing and governance but also a significant challenge to analyze user activities and ensure proper procedures are in place to prevent data breach and generate insights to enforce right security controls. Current tools are unable to provide detailed analytics based on data from disparate big data sources and platforms.

These and other drawbacks exist.

SUMMARY OF THE INVENTION

According to one embodiment, the invention relates to a method that manages data from a plurality of disparate big data sources. The method comprises the steps of: receiving, via a communication network, data from a plurality of independent big data platforms, wherein the data is managed in a unified framework implemented across heterogeneous platforms and multiple clusters; identifying, via an access limits file system, one or more entitlements associated with the data; monitoring, via a computer processor, data usage comprising authentication failures, authorization failures, personally identifiable information (PII) queries and Data Manipulation Language (DML) queries wherein the data usage is parsed by a selected filter according to one of platform, cluster, application, service, environment, action type and action name; and graphically displaying, via a user interactive interface, each of: authentication failures, authorization failures, PII queries and DML queries based on the selected filter.

According to another embodiment, the invention relates to a system that manages data from a plurality of disparate big data sources. The system comprises: an interface that communicates with a plurality of independent big data platforms; an access limits file system that manages user and data entitlements; an interactive user interface that manages and presents monitored data usage; and a computer processor, coupled to the interface and the access limits file system, the computer processor is further configured to: receive, via a communication network, data from the plurality of independent big data platforms, wherein the data is managed in a unified framework implemented across heterogeneous platforms and multiple clusters; identify one or more entitlements associated with the data; monitor data usage comprising authentication failures, authorization failures, personally identifiable information (PII) queries and Data Manipulation Language (DML) queries wherein the data usage is parsed by a selected filter according to one of platform, cluster, application, service, environment, action type and action name; and graphically display, via the user interactive interface, each of: authentication failures, authorization failures, PII queries and DML queries based on the selected filter.

The system may include a specially programmed computer system comprising one or more computer processors, interactive interfaces, electronic storage devices, and networks.

The computer implemented methods described herein provide unique advantages to entities, organizations, data owners and other users, according to various embodiments of the invention. The innovative system and method provides a framework that enables monitoring of the data from disparate big data platforms and sources. The innovative framework provides multi-dimensional views of data usage by platform, cluster, application, service, actions, user, and other factors through a metadata driven data usage dashboard. An embodiment of the present invention is directed to capturing and reporting actions performed by human users, functional ID, administrator ID, and privileged accounts. The innovative framework provides end-to-end views of user entitlements across platforms, clusters and objects and further provides a rule-based exception/abnormal data activity/access violations monitoring engine. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

According to an embodiment of the present invention, a Data Use Monitoring system represents a unified framework for big data usage analytics and security profiling across heterogeneous platforms and multiple clusters. The Data Use Monitoring system may provide various features, including (1) policy driven personally identifiable information (PII) data usage trend analysis; (2) multi-dimensional view of the data usage by platform, cluster, application, service, actions, PII data and users; (3) auditing capability and preventing data leakages; (4) rule based exception/abnormal activity/policy violations monitoring engine; (5) end-to-end view of the user entitlements across platforms clusters and objects; and (6) usage summary with drilldown capability to track from platform level view to single user micro action level. The Data Use Monitoring system is further scalable across multiple technologies, platforms and clusters.

The Data Use Monitoring system may be directed to discovering anomalies including process drawbacks, authentication and authorization failures across clusters and technologies. The innovative system further identifies detailed PII data elements that are accessed across billions of data records. An embodiment of the present invention may be directed to monitoring data by platform, cluster, application, service, action and big data security product related organizations.

An embodiment of the present invention may be applied in various applications and use cases. This may include auditing for Big Data lakes; capacity assessment and charge back functionality for Big Data infrastructure and clusters and resource usage analytics. In addition, the system may prevent and/or address data breaches automatically and enforce right security controls automatically based on the severity of the security issues. The system further develops and/or implements a recommendation engine to identify unused/uncovered data assets by analyzing existing data assets and data usage trend.

Figure 1:
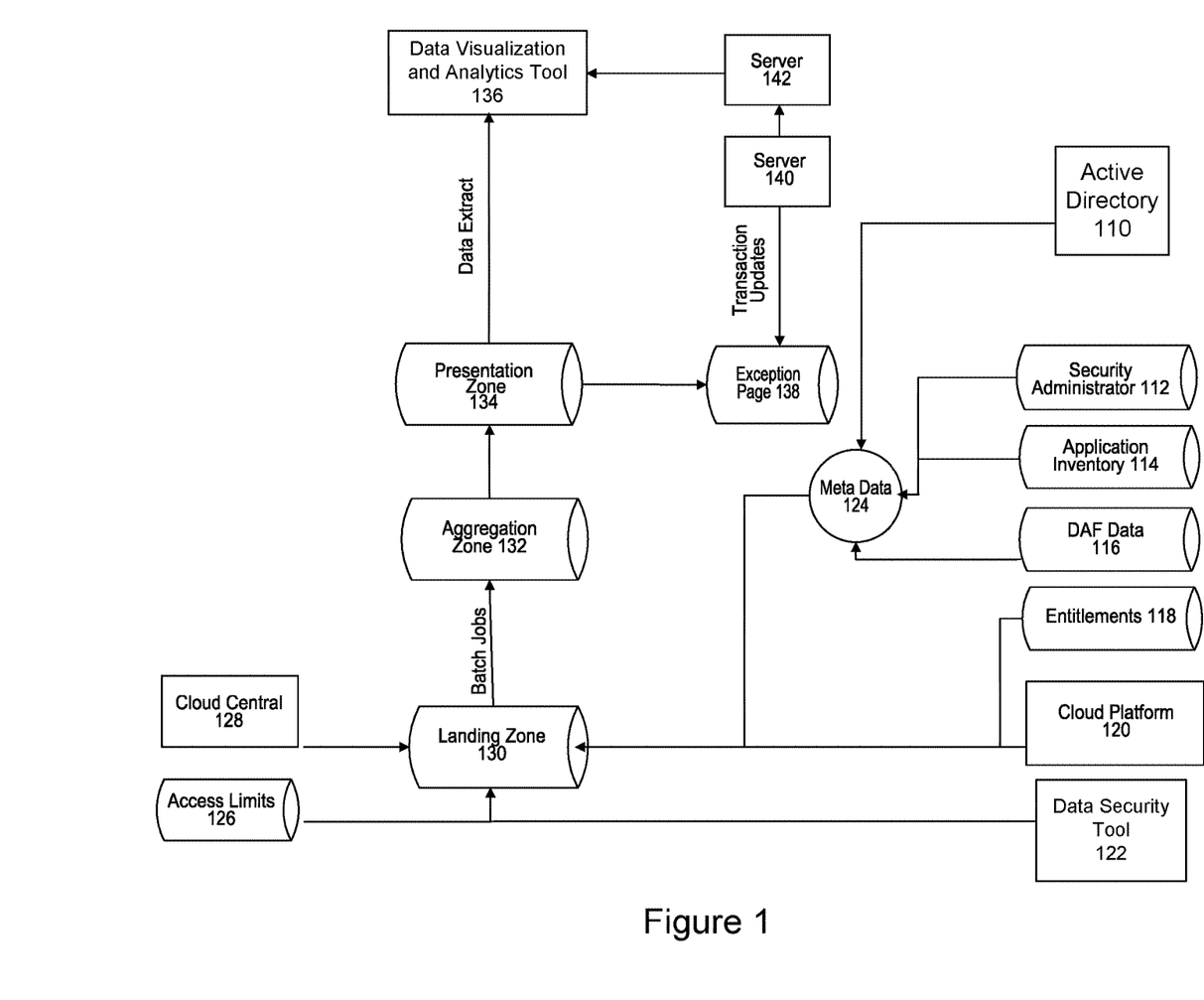
FIG. 1 is an exemplary system diagram for implementing data use monitoring, according to an embodiment of the present invention.

FIG. 1 is an exemplary system diagram for implementing data use monitoring, according to an embodiment of the present invention. An embodiment of the present invention is directed to identifying who accessed what datasets when and in what manner (e.g., HDFS, Hive, Impala, etc.) in large big data platforms. An embodiment of the present invention identifies end-to-end (E2E) entitlements views for a given user across multiple clusters and further identifies who is accessing confidential and highly confidential datasets.

FIG. 1 illustrates various sources of data, which may include Active Directory 110, Security Administrator 112, Application Inventory 114, DAF Data 116, Entitlements 118, Cloud Platform 120 and Database Security Tool 122.

Active Directory 110 represents enterprise and other related data. Security Administrator 112 represents a tool that provides a layer of security to a system. Application Inventory 114 represents system of record for clusters infrastructure. Data Acquisition Form (DAF) Data 116 represents data confidentiality metadata. Entitlements 118 may represent a massively parallel data platform that manages data relating to entitlements, which may include unstructured data and other types of data. Cloud Platform 120 represents a cloud-based platform that provides data management services for big data. Database Security Tool 122 represents a data protection tool for databases that provides automated sensitive data discovery and classification as well as system level logs in unstructured format. Other data sources may include various big data platforms, Hadoop, SQL based platforms, relational database management system (RDMS), etc. The data from the various platforms may be collected at Data Acquisition Metadata 124. Access Limits 126 may represent user privileges, authorization information, etc. Cloud Central 128 may represent an image parser to obtain access control limits that manages entitlements to files, etc. Landing Zone 130 may represent a distributed file system that collects entitlement data and data from various platforms. For example, Landing Zone 130 may represent Hadoop Distributed File System (HDFS) as well as other file systems. Aggregation Zone 132 may aggregate the data from various big data and other sources. Aggregation Zone 132 may represent Apache HIVE as well as other data warehouse tools that provide data queries and analysis. Presentation Layer 134 may generate data for presentation and communication to an interactive user interface and/or dashboard. Presentation Layer 134 may represent a data views tool as well as other presentation tools. The data may then be communicated to a Data Visualization and Analytics Tool 136 that provides an end-to-end analytics platform for the data. The data may also be communicated to an Exception Store 138 to store and manage exceptions data with respect to authentication, authorization and confidential data access failures. Servers 140 and 142 may provide exception reporting features by obtaining data from Exception Store 138. For example, Servers 140 and 142 may also implement a rules-based engine for identifying and address exceptions.

An embodiment of the present invention further provides fault tolerance. For example, the system may monitor and manage a set of 10 clusters. If a node in any of the clusters randomly goes down, an embodiment of the present invention may pull data from a backlog and resume operations.

An embodiment of the present invention is directed to monitoring data usage and/or access across multiple data platforms, clusters and locations. Platforms may include multi-tenant, multi-use data platforms where data may be sourced from multiple disparate datasets that are internal as well as external to an entity. For a financial institution, for example, data may be received from an investment bank, consumer bank and external sources (e.g., structured and unstructured data, data from search engines, social media, third parties, etc.). The data may be collected and stored in a common repository managed by the financial institution, by following the respective data policies and regulation policies.

In accordance with the various embodiments of the present invention, many different services may access various subsets of the common repository for many different applications and uses. For example, various teams and users may access the data for advanced analytics on card services; fraud and risk analytics to detect anomalies and development of marketing strategy and campaigns, etc.

An embodiment of the present invention is directed to managing data in a complex environment and more specifically to understanding who is accessing the data, what data is accessed, for what purpose, service or application, etc. Moreover, an embodiment of the present invention is further directed to compliance with policies, guidelines, confidentiality requirements as well as access entitlements. For example, an embodiment of the present invention may apply company-wide policies with respect to data access controls. An embodiment of the present invention may further apply access and/or use restrictions on sensitive data (e.g., confidential information). Moreover, access to data may include various complex permutations, which may involve requiring access to other related data and/or underlying data. For example, access to a subset of card data may require access to mortgage data and further require access to a card-specific technology. An embodiment of the present invention provides transparency regarding how data is accessed and used and thereby provides a level of confidence as to proper management of sensitive and other data. An embodiment of the present invention is directed to providing transparency to managed data and further empowering various users to access data analytics regarding a shared platform.

According to another example, data owners may require an audit or accounting of how their data (that the data owners are responsible for) is being accessed and used throughout an organization. This may involve determining who is accessing PII data and whether those accessing the data are properly authorized to access and act on the PII data. This may affect various use cases across multiple clusters and multiple data platforms to provide a unified view by aggregating the information from various big data platforms into a centralized tool that organizes the data, aggregates the data, parses the data and further matches the data with metadata for data analytics and reporting through an interactive user interface or dashboard.

Figure 2:
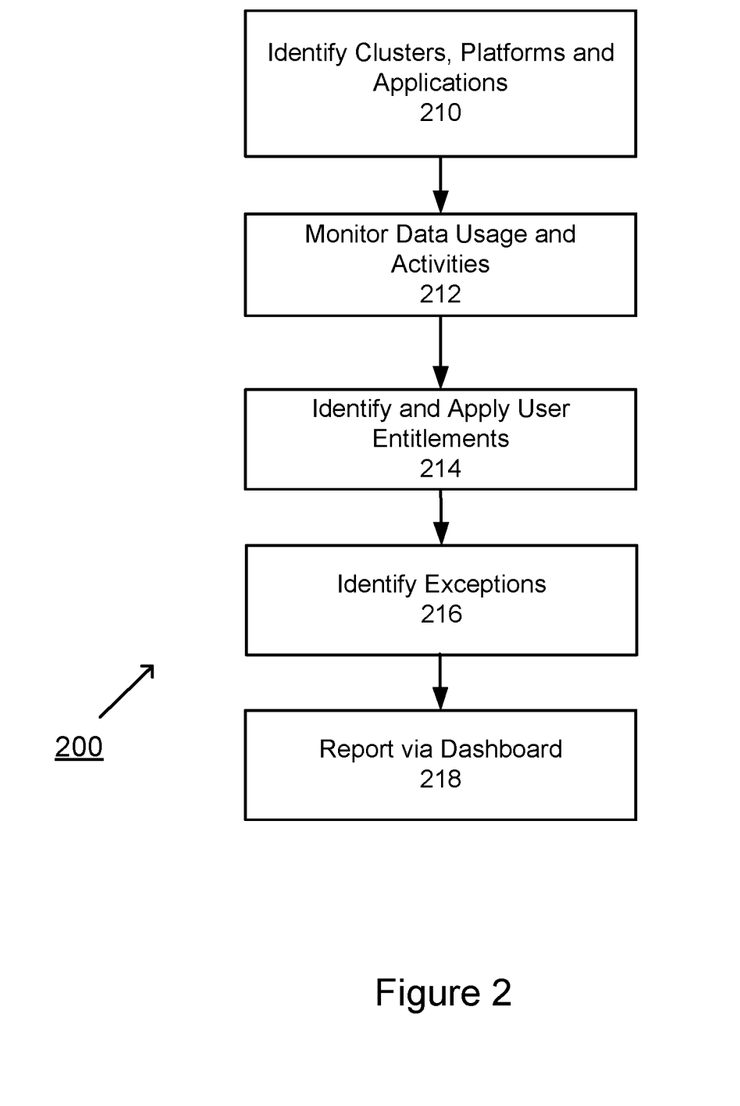
FIG. 2 is an exemplary flow diagram for implementing data use monitoring, according to an embodiment of the present invention.

FIG. 2 is an exemplary flow diagram 200 for implementing data use monitoring, according to an embodiment of the present invention. At step 210, platforms, clusters and applications may be identified. At step 212, an embodiment of the present invention may monitor data usage and activities. At step 214, user entitlements may be identified and managed. At step 216, exceptions may be identified. At step 218, data usage may be reported via an interactive user interface. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Each step is described in further detail below.

At step 210, platforms, clusters and applications may be identified. For example, data may be received from a plurality of independent big data platforms, wherein the data is managed in a unified framework implemented across heterogeneous platforms and multiple clusters.

At step 212, an embodiment of the present invention may monitor data usage and activities. This may include monitoring data usage to determine authentication failures, authorization failures, PII queries and Data Manipulation Language (DML) queries. The data usage may be parsed by filters, including platform, cluster, application, service, environment, action type and action name.

At step 214, user entitlements may be identified and managed. Access entitlements may refer to privileges and permissions, including read, write, access, etc. Additional analytics may include how the data is being used, what percentage of data is being used, what percentage of data is not being used, which region of users are using the data, what datasets are most heavily used, etc. Various analytics, metrics and determinations may be supported.

At step 216, exceptions may be identified. This may include exception investigation status involving data access, login failure, privilege access and access failure. For example, the system may recognize that a particular user is attempting multiple authentications and multiple authorizations within a time period, e.g., a single day. The system may be alerted because the number of attempts are above a threshold number, e.g., 100 attempts. Such events may lead to a security issue. An embodiment of the present invention may implement a rule based engine to identify such events and trigger an exception report or notification. In addition, the system may recognize that in another environment, application or cluster, this event may not be considered a threat or issue. For example, the system may recognize that the 100 attempts were associated with a testing application. Accordingly, an embodiment of the present invention may update rules accordingly so that the same event may be treated intelligently.

At step 218, data usage may be reported via an interactive user interface. An embodiment of the present invention provides data usage heat map and cold data discovery; usage accounting and reporting; and provides 30/60/90 days report for IDs not used to proactively identify dormant IDs and list candidates for removal. An embodiment of the present invention further provides reports for most often used data elements to prioritize defining the data elements by data management team; provides an ability to visualize and report the x-LOB access to the data to data domain owners; builds capability to empower the business users to govern and manage the workspaces including controlling data lifecycle and access and enables discovery of unregistered datasets and report exceptions.

An embodiment of the present invention is directed to integration of policy based cold data discovery with archival tools and services; extends data use monitoring to support other big data tools; supports integration with Unified Data Services (UDS) and other metadata repositories; integrates with internal systems to provide application specific views instead of tenant specific; builds capabilities to monitor compliance with data retention requirements and report compliance exception; and identifies platform usage patterns analysis and optimization opportunities.

Figure 3:
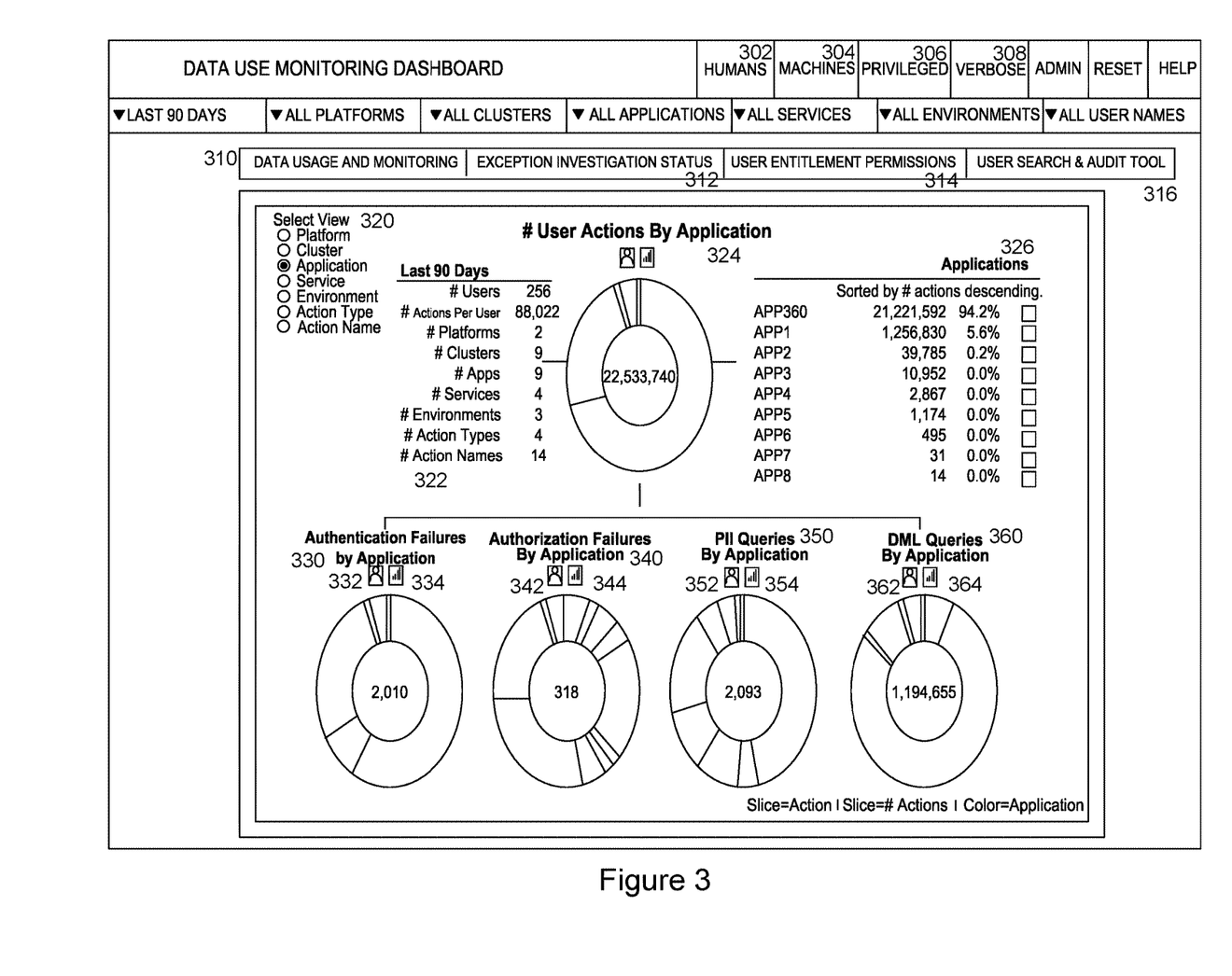
FIG. 3 is an exemplary screenshot of a Data Use Monitoring Dashboard, according to an embodiment of the present invention.

FIG. 3 is an exemplary screenshot of a Data Use Monitoring Dashboard, according to an embodiment of the present invention. According to an embodiment of the present invention, a Data Use Monitoring dashboard monitors data usage and activities across various clusters of massively parallel data platforms, such as Greenplum, Hadoop, etc., for applications with approved Data Acquisition Forms (DAFs). This capability may be used to support the ability to identify and report on fraudulent, prohibited and/or other undesirable behavior, with minimal impact on user operations and productivity. This provides user level and Hadoop service level audit capabilities along with a more comprehensive set of capabilities, such as platform, cluster and/or application level analysis, exceptions reporting, and a consolidated view of the entitlements for privileged users, machines and regular users. The monitoring may be performed at HDFS, Hive and Impala service level too.

An embodiment of the present invention is directed to securing data and controlling data breaches. In order to achieve this, database tables and/or data files may be secured and continuously monitored for abnormal activity. Whenever abnormal behavior is observed inside any database, alerts may be raised and data protection workflows may be triggered. Another critical element in the solution is directed to sending real-time alerts, so that as soon as a violation of policy is detected, it may be handled immediately.

As shown in FIG. 3, user interaction buttons allow the user to toggle between human activities (SID) 302, machine activities (FID) 304, privileged activities 306 (e.g., elevated user privileges) and verbose activities 308 (e.g., multi-tier actions and sub-actions).

As shown in FIG. 3, an exemplary interactive user interface, such as a dashboard, may have multiple tabs. FIG. 3 illustrates four exemplary tabs, shown as Data Usage and Monitoring Tab 310, Exception Investigation Status Tab 312, User Entitlement Permissions Tab 314 and User Search & Audit Tool 316. Data Usage and Monitoring Tab 310 may represent a summary of data usage. Exception Investigation Status Tab 312 may provide exception investigation details. User Entitlement Permissions Tab 314 shows entitlements and User Search & Audit Tool 316 provides the ability to search for a particular identifier. In this example, the second and third tab may require single sign-on (SSO) authorization and further require the user to be part of the applicable Application Development (AD) group.

The dataset may be refined by period, platform, cluster, etc. Data Usage and Monitoring Tab 310 provides a quick summary of usage and may be controlled by the view button on the left side. A view may be selected at 320 and may include options, such as Platform, Cluster, Application, Service, Environment, Action Type and Action Name. Other view options may be applied. As shown in FIG. 3, metrics for a period of time may be displayed at 322. The metrics may include number of users, number of actions per user, number of platforms, number of clusters, number of applications, number of services, number of environments, number of action types and number of action names. In this example, the period of time may include the last 90 days. Other time periods may be applied. Interface 324 represents a graphic that illustrates a number of user actions by application. Application details may be illustrated at 326 and may include number of actions and corresponding percentage.

The bottom section provides summaries for four exemplary indicators 1) Failed logins 2) PII queries 3) Entitlement Denials, and 4) Data Manipulation Language (DML) queries (e.g., select, insert, update). This functionality may be represented as Authentication Failures by Application 330, Authorization Failures by Application 340, PII Queries by Application 350 and DML Queries by Application 360. Failed logins may refer to when a user is not able to login to a cluster successfully. Entitlement denials may refer to when a user authenticated successfully but is not authorized to perform any operation for respective objects.

Figure 4:
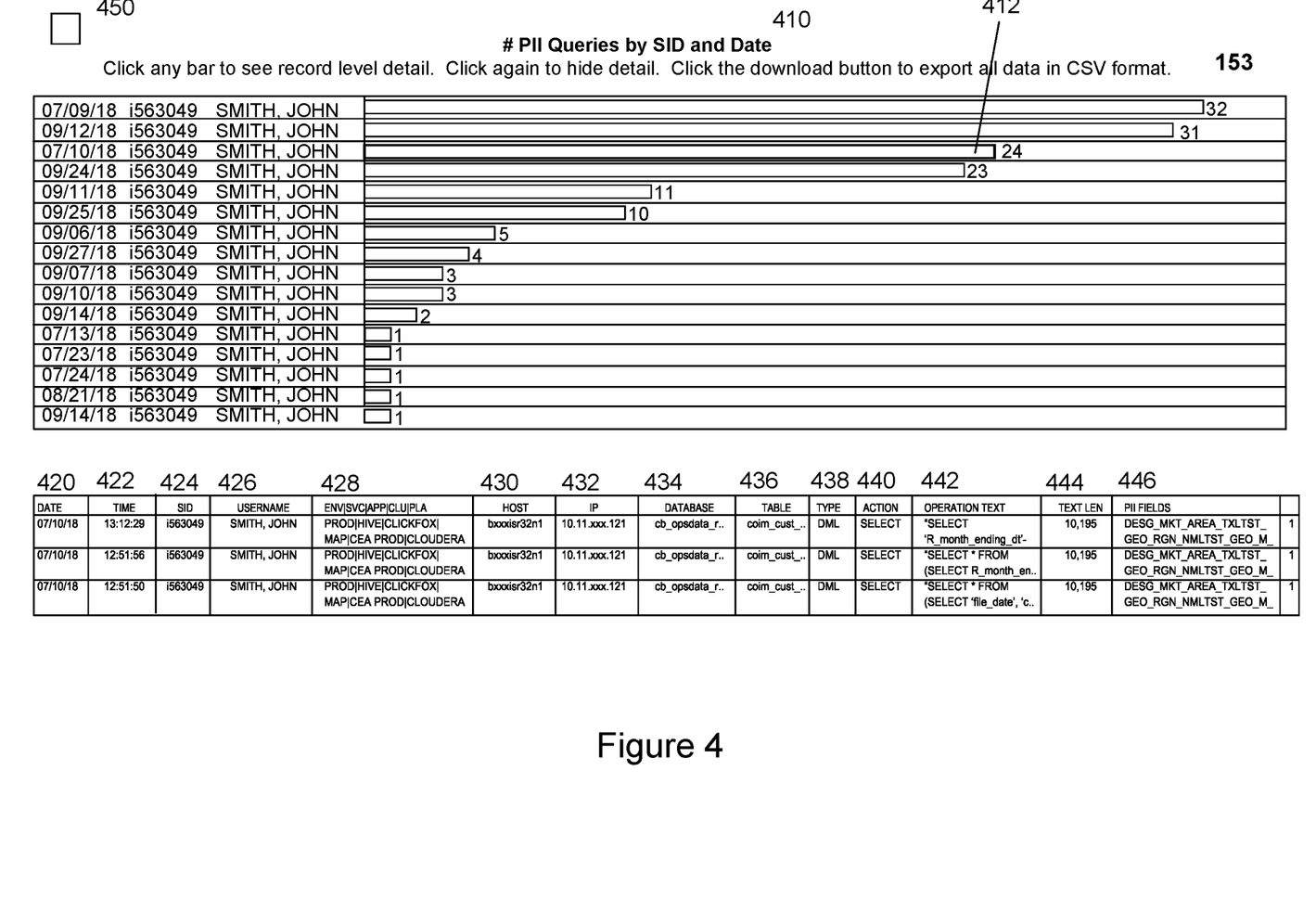
FIG. 4 is an exemplary screenshot of a drilldown by user, according to an embodiment of the present invention.

In this example, each section may have two buttons, 332/334; 342/344; 352/354 and 362/364. A first button may provide details concerning "Who Did What & When." An exemplary interface is shown in FIG. 4. This may represent a drill down section with a leaderboard-type chart showing user actions.

Figure 5:
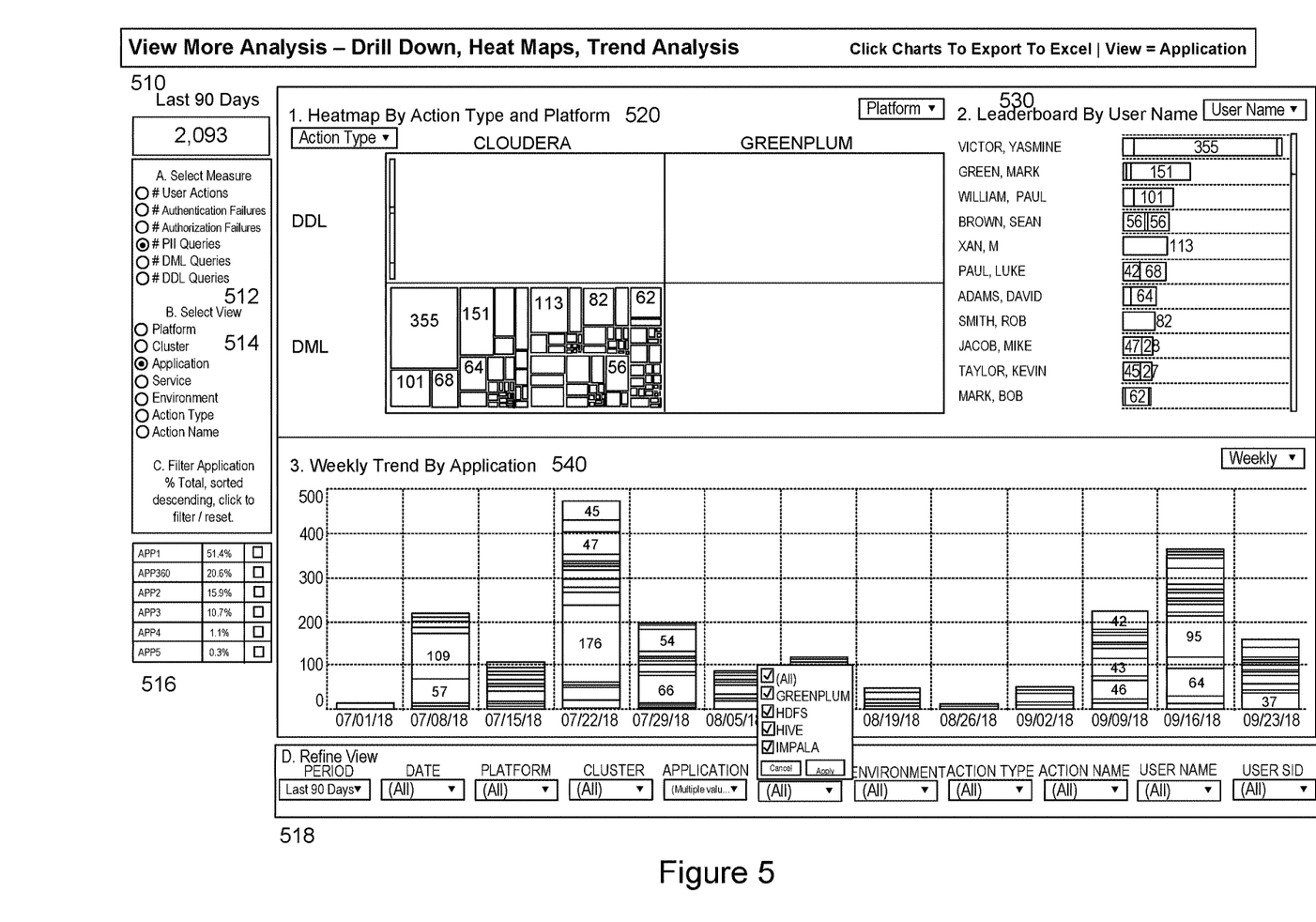
FIG. 5 is an exemplary screenshot of a drilldown analysis, according to an embodiment of the present invention.

A second button may provide a view of more analysis. An exemplary interface is shown in FIG. 5. This may represent a drill down section with heat maps, trend analysis and leaderboard by users across several key indicators including PII access, DML, Data Definition Language (DDL) (e.g., create, alter, drop), and Entitlement Denials. In this example, users may select various parameters to further refine their views. In addition, interacting with a chart may open a "Who Did What & When" functionality so a user may view record level details for that portion of the chart analysis.

The data source for an exemplary dashboard may include a Hive table. Data may be refreshed periodically and may be predetermined, e.g., every day at 7:00 AM EST. For example, dashboard data may be limited to a maximum of 90 days to provide desired performance, although the back-end Hive data is retained for 365 days. Data for Machines may also be available for 90 days but may be limited to 30 days in the future to maintain desired performance levels. Other time periods and factors may be applied.

FIG. 4 is an exemplary screenshot of a drilldown by user, according to an embodiment of the present invention. As shown in FIG. 4, details regarding PII Queries by identifier (e.g., SID) and Date 410 may be provided. Additional record level details may be provided by interacting with any bar (or other graphic). For example, by clicking on bar 412, additional details may be provided, which may include Date 420, Time 422, SID 424, Username 426, Environment/Service/Application/Cluster/Platform 428, Host 430, IP 432, Database 434, Table 436, Type 438, Action 440, Operation Text 442, Text Length 444, and PII Fields 446.

By clicking any bar, such as bar 412, a user may view record level detail for a particular user including timestamp, operation, service, environment and platform. In addition, clicking the download button 450 may export a view to another application, such as a spreadsheet application.

FIG. 5 is an exemplary screenshot of a drilldown analysis, according to an embodiment of the present invention. Data use monitoring may be displayed in various formats, including Heatmap by Action Type and Platform 520, Leaderboard by User Name 530 and Weekly Trend by Application 540. The user may view data for a time period, such as last 90 days, as shown by 510. The user may also specify metrics, at Select Measure 512, Select View 514, Filter Application 516 and Refine View 518.

Figure 6:
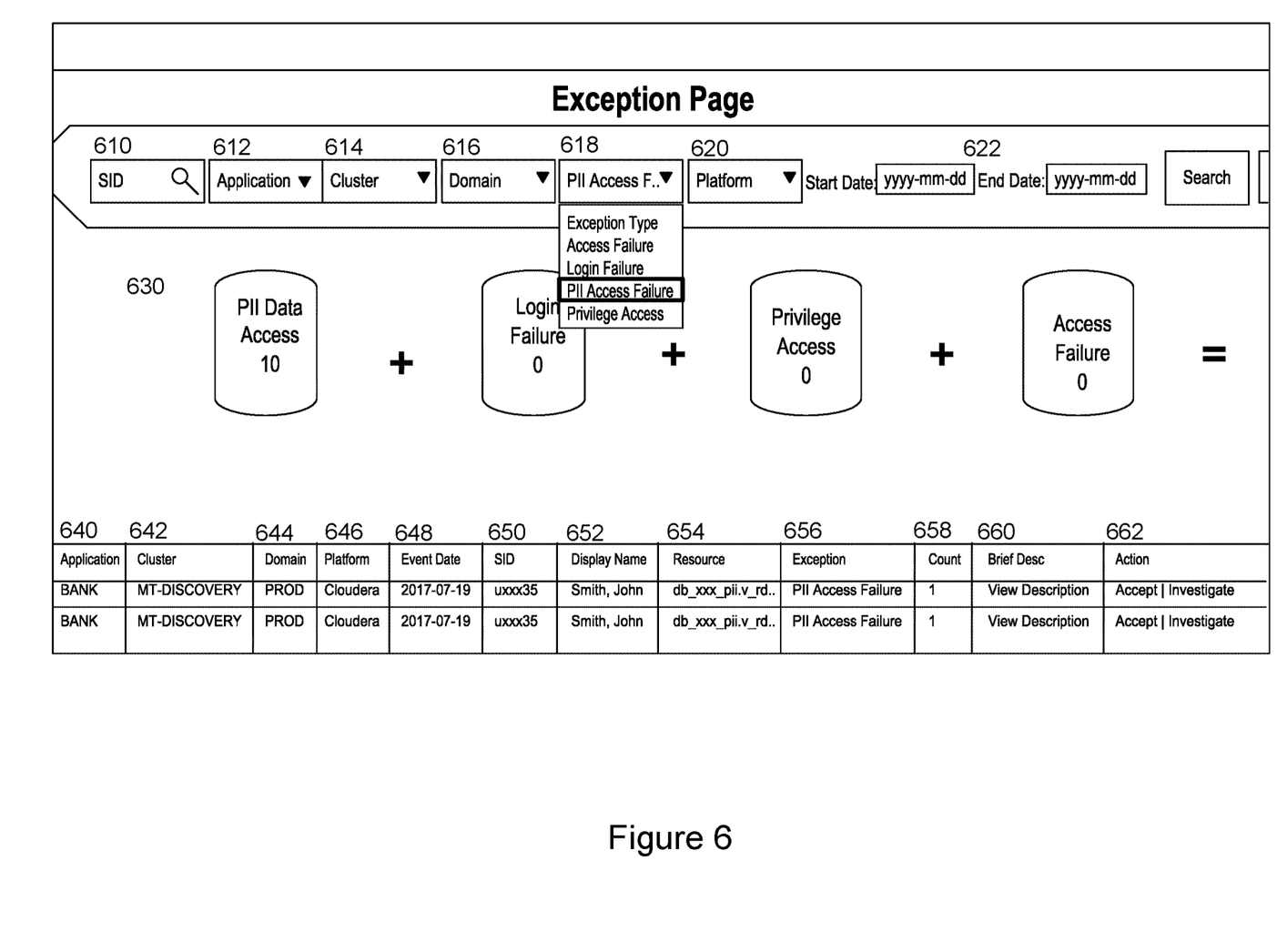
FIG. 6 is an exemplary screenshot of an exception reporting feature, according to an embodiment of the present invention.

FIG. 6 is an exemplary screenshot of an exception reporting feature, according to an embodiment of the present invention. FIG. 6 illustrates an exemplary exception page. Exceptions may include identifier 610, relevant application 612, cluster 614, domain 616, exception type 618, platform 620 and time range 622. In this example, exception reporting may include PII Data Access, Login Failure, Privilege Access and Access Failure shown at 630. Additional details may be shown, including Application 640, Cluster 642, Domain 644, Platform 646, Event Date 648, SID 650, Display Name 652, Resource 654, Exception 656, Count 658, Brief Description 660 and Action 662.

Figure 7:
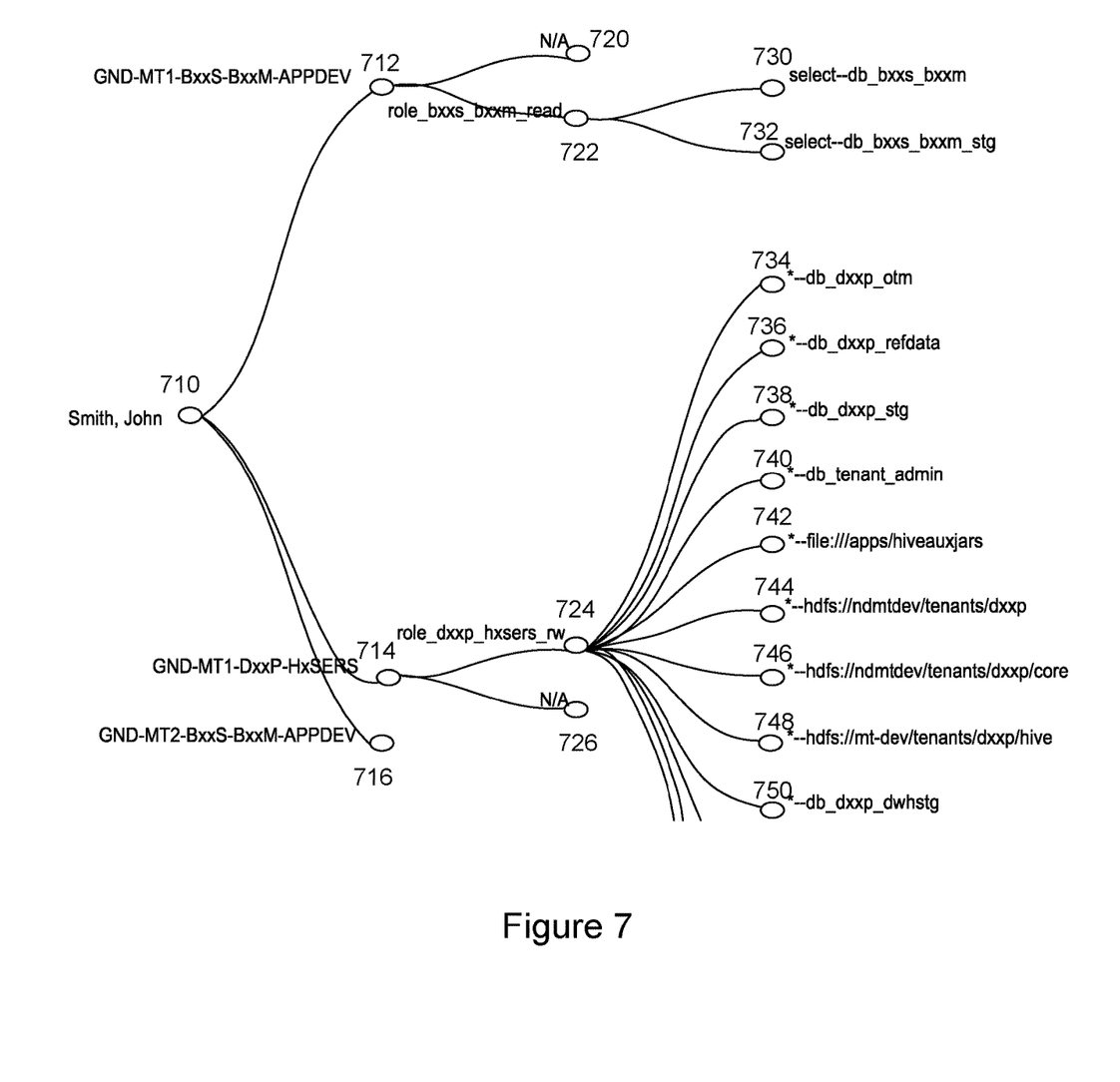
FIG. 7 is an exemplary screenshot of an entitlements view, according to an embodiment of the present invention.

FIG. 7 is an exemplary screenshot of an entitlements view, according to an embodiment of the present invention. In this example, a user may be identified at 710. Nodes 712, 714, and 716 represent various groups that a user belongs to. Node 720, 722, 724, 722, 724 and 726 represent various roles that user has. Nodes 730, 732, 734, 736, 738, 740, 742, 744, 746, 748, and 750 represent privileges that user has for respective data objects. The illustration of FIG. 7 is one example; other entitlement structures and schemes may be applied.

Figure 8:
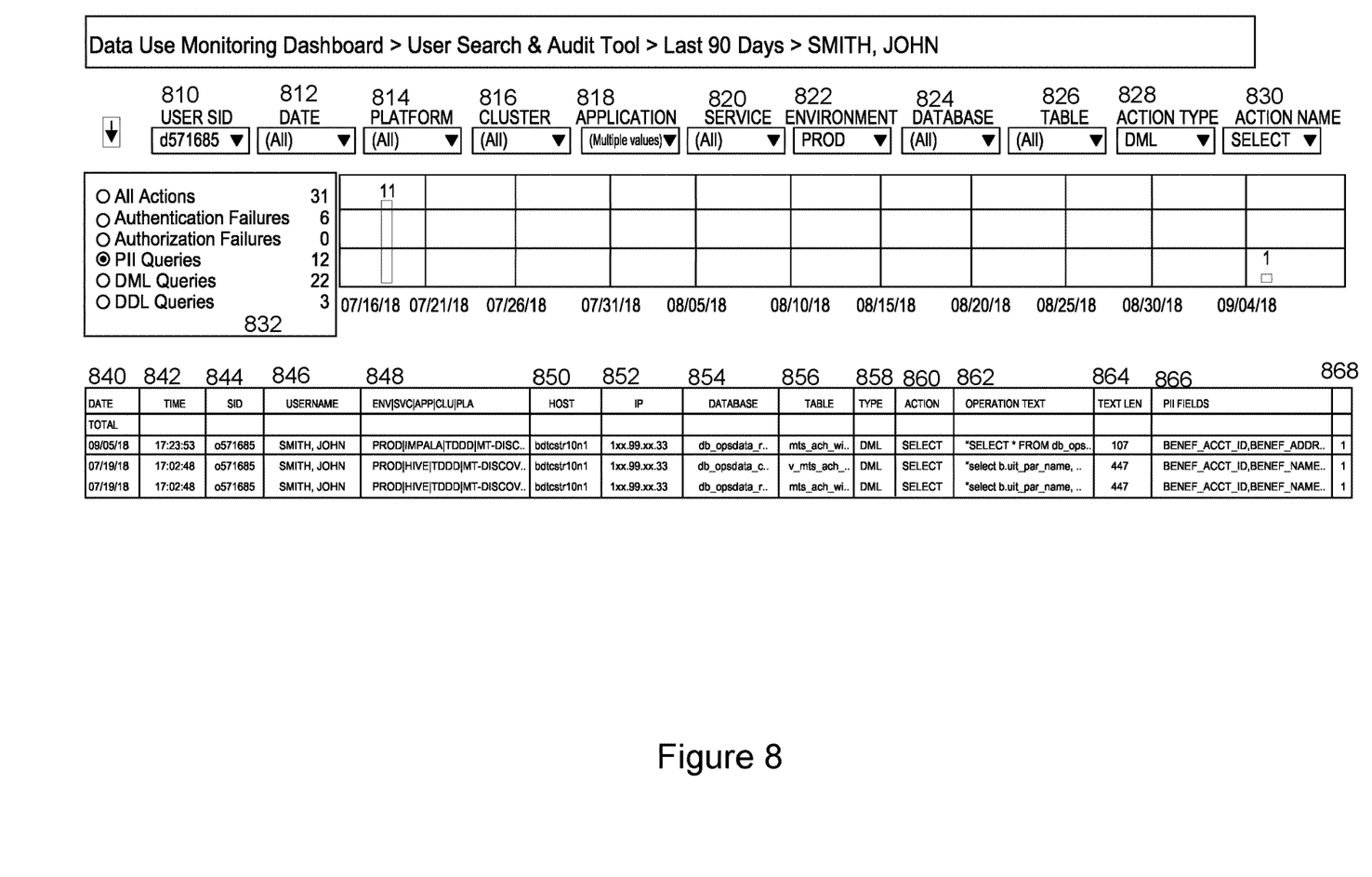
FIG. 8 is an exemplary screenshot of a User Search and Audit Tool, according to an embodiment of the present invention.

FIG. 8 is an exemplary screenshot of a User Search and Audit Tool, according to an embodiment of the present invention. FIG. 8 provides details regarding data use monitoring. As shown in FIG. 8, a user may conduct search and auditing functionality based on various metrics which may include User Identifier 810, Date 812, Platform 814, Cluster 816, Application 818, Service 820, Environment 822, Database 824, Table 826, Action Type 828 and Action Name 830. Section 832 provides a count of certain actions. Other actions and/or metrics may be captured. Section 834 provides a graphical representation of a selected action. In this example, there are 12 PII Queries where 11 queries were executed in the July 2018 time period and a single query was executed in the September 2018 time period. Other illustrations may be provided. Additional details may be provided in a graph format based on various metrics and/or factors, which may include Date 840, Time 842, SID 844, Username 846, Environment/Service/Application/Cluster/Platform

848, Host 850, IP 852, Database 854, Table 856, Type 858, Action 860, Operation Text 862, Text Length 864, PII Fields 866. Column 868 represents a number of times an action is taken by a respective user.

An embodiment of the present invention is directed to recommending one or more optimization parameters for improving the performance of jobs by leveraging the Data Use monitoring framework and Machine Learning algorithms. An embodiment of the present invention is directed to discovering data sets and corresponding usage patterns for any given record classification code defined according to various policies, including risk and compliance policies. An embodiment of the present invention is directed to classifying the data for various temperatures and thereby enabling platform owners to take or initiate respective decisions and/or actions to reduce storage costs significantly.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A method that manages data from a plurality of disparate big data sources, the method comprising the steps of:
   receiving, via a communication network, the data from a plurality of independent big data platforms;
   monitoring, via a computer processor, data usage and activities including authentication failures, authorization failures, personally identifiable information (PII) queries and Data Manipulation Language (DML) queries;
   identifying, via an access limits file system, one or more entitlements associated with the data; and
   graphically displaying, via a user interactive interface, each of the monitored authentication failures, authorization failures, PII queries and DML queries.

2. The method of claim 1, wherein the user interactive interface comprises an exception investigation status interface.

3. The method of claim 2, wherein the exception investigation status interface comprises data access, login failure, privilege access and access failure.

4. The method of claim 1, wherein the user interactive interface comprises a user entitlements and permissions interface.

5. The method of claim 4, wherein the user entitlements and permissions interface comprises a node arrangement view.

6. The method of claim 1, wherein the user interactive interface comprises a user search and audit tool interface.

7. The method of claim 6, wherein the user search and audit tool interface enables a search function based on user identifier, date, platform, cluster, application, service, environment, database, table, action type and action name.

8. The method of claim 1, wherein for each of: authentication failures, authorization failures, PII queries and DML, queries, an option to view action by user is provided.

9. The method of claim 8, wherein the view action by user comprises user identifier and record level detail.

10. The method of claim 1, wherein for each of: authentication failures, authorization failures, PII queries and DML queries, an option to view details is provided, the view details comprising a heatmap by action type and platform, leaderboard by user name and weekly trend by application.

11. A system that manages data from a plurality of disparate big data sources, the system comprising:
    an interface that communicates with a plurality of independent big data platforms;
    an access limits file system that manages user and data entitlements;
    an interactive user interface that manages and presents monitored data usage; and
    a computer processor, coupled to the interface and the access limits file system, the computer processor is further configured to:
    receive, via a communication network, the data from a plurality of independent big data platforms;
    monitor data usage and activities including authentication failures, authorization failures, personally identifiable information (PII) queries and Data Manipulation Language (DML) queries;
    identify one or more entitlements associated with the data; and
    graphically display, via the user interactive interface, each of the monitored authentication failures, authorization failures, PII queries and DML queries.

12. The system of claim 11, wherein the user interactive interface comprises an exception investigation status interface.

13. The system of claim 12, wherein the exception investigation status interface comprises data access, login failure, privilege access and access failure.

14. The system of claim 11, wherein the user interactive interface comprises a user entitlements and permissions interface.

15. The system of claim 14, wherein the user entitlements and permissions interface comprises a node arrangement view.

16. The system of claim 11, wherein the user interactive interface comprises a user search and audit tool interface.

17. The system of claim 16, wherein the user search and audit tool interface enables a search function based on user identifier, date, platform, cluster, application, service, environment, database, table, action type and action name.

18. The system of claim 11, wherein for each of: authentication failures, authorization failures, PII queries and DML, queries, an option to view action by user is provided.

19. The system of claim 18, wherein the view action by user comprises user identifier and record level detail.

20. The system of claim 11, wherein for each of: authentication failures, authorization failures, PII queries and DML queries, an option to view details is provided, the view details comprising a heatmap by action type and platform, leaderboard by user name and weekly trend by application.

* * * * *